June 5, 1962
R. O. DU PONT
3,037,693
NAVIGATIONAL AID
Filed June 5, 1961
3 Sheets-Sheet 1
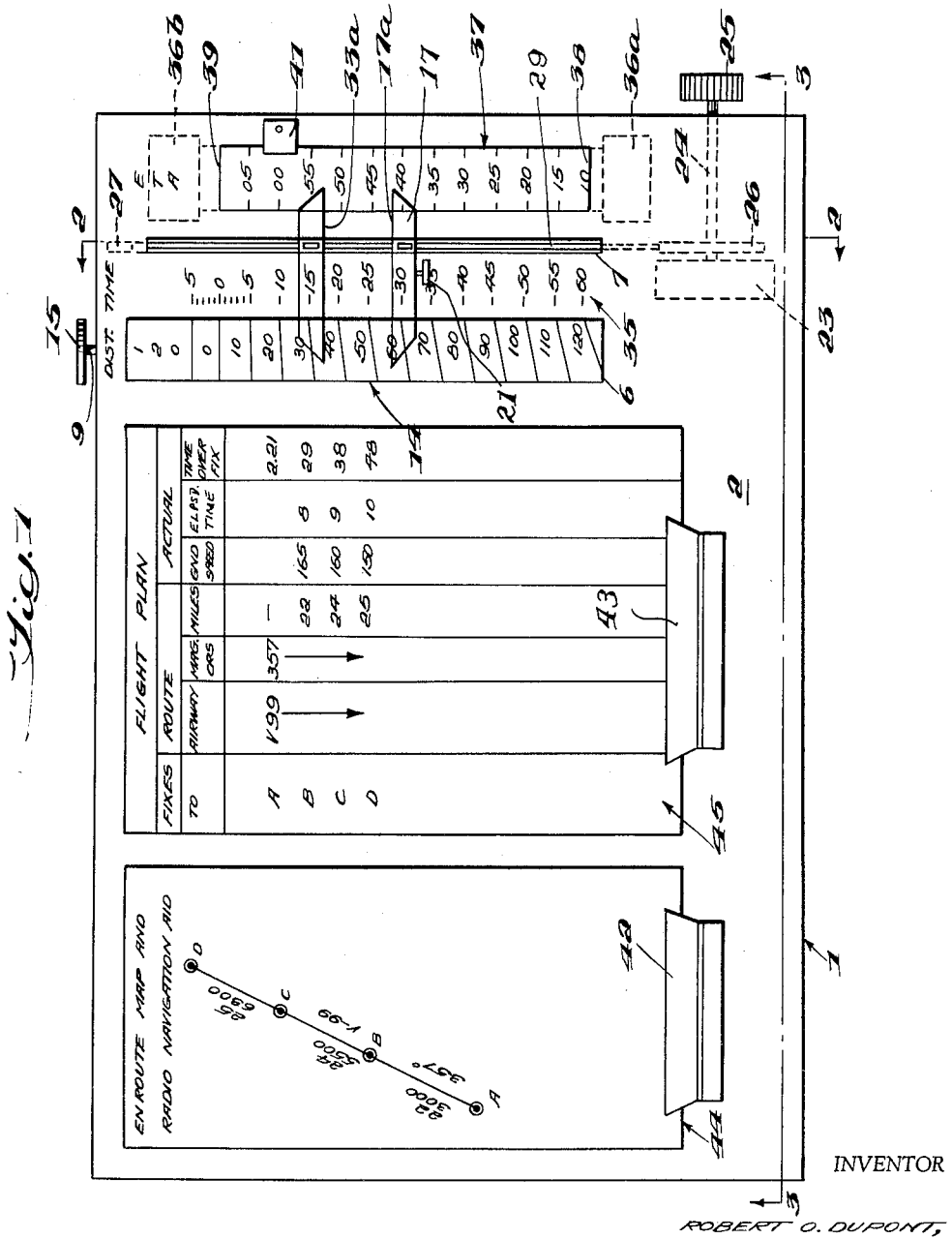
INVENTOR
ROBERT O. DUPONT,
BY Dodge and Sons
ATTORNEYS

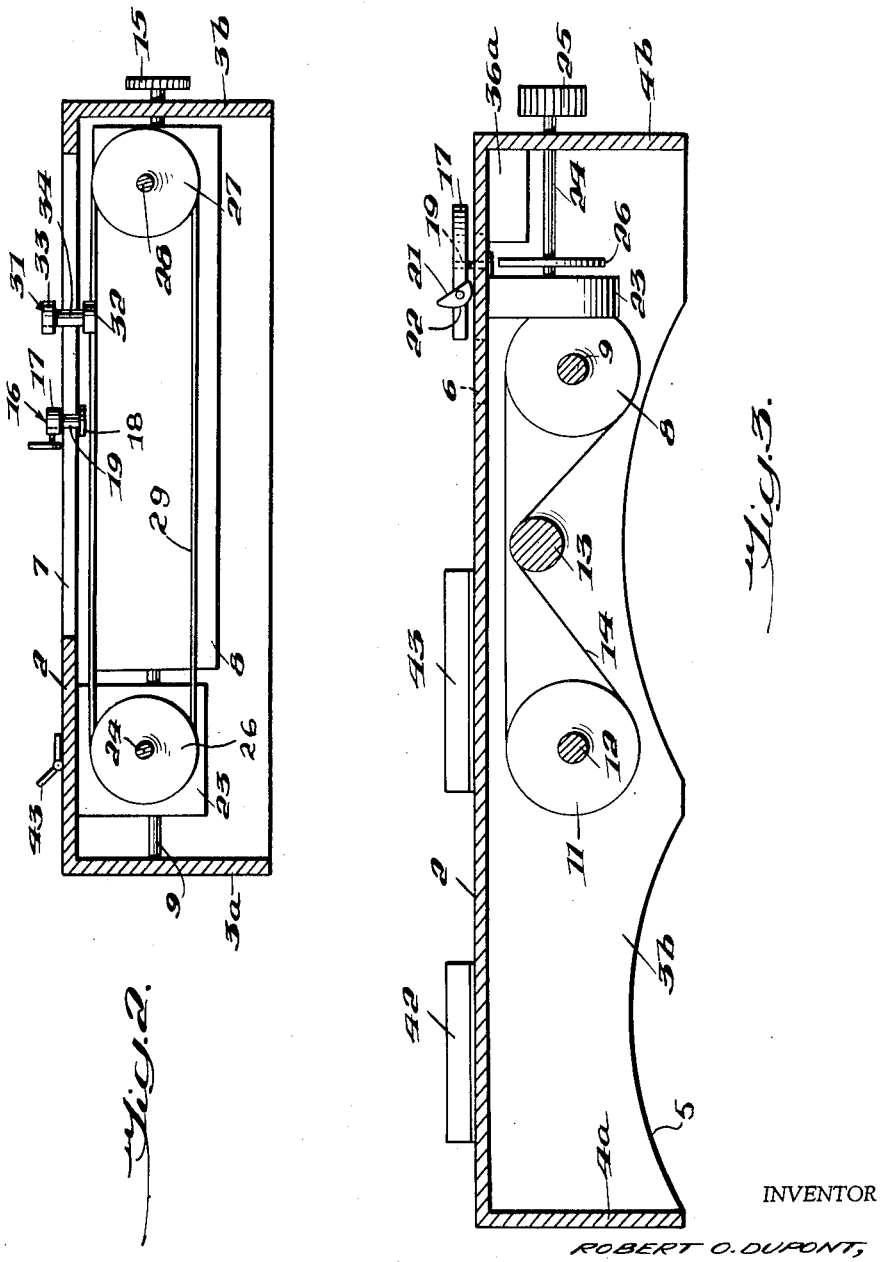

June 5, 1962 R. O. DU PONT 3,037,693
NAVIGATIONAL AID
Filed June 5, 1961 3 Sheets-Sheet 3
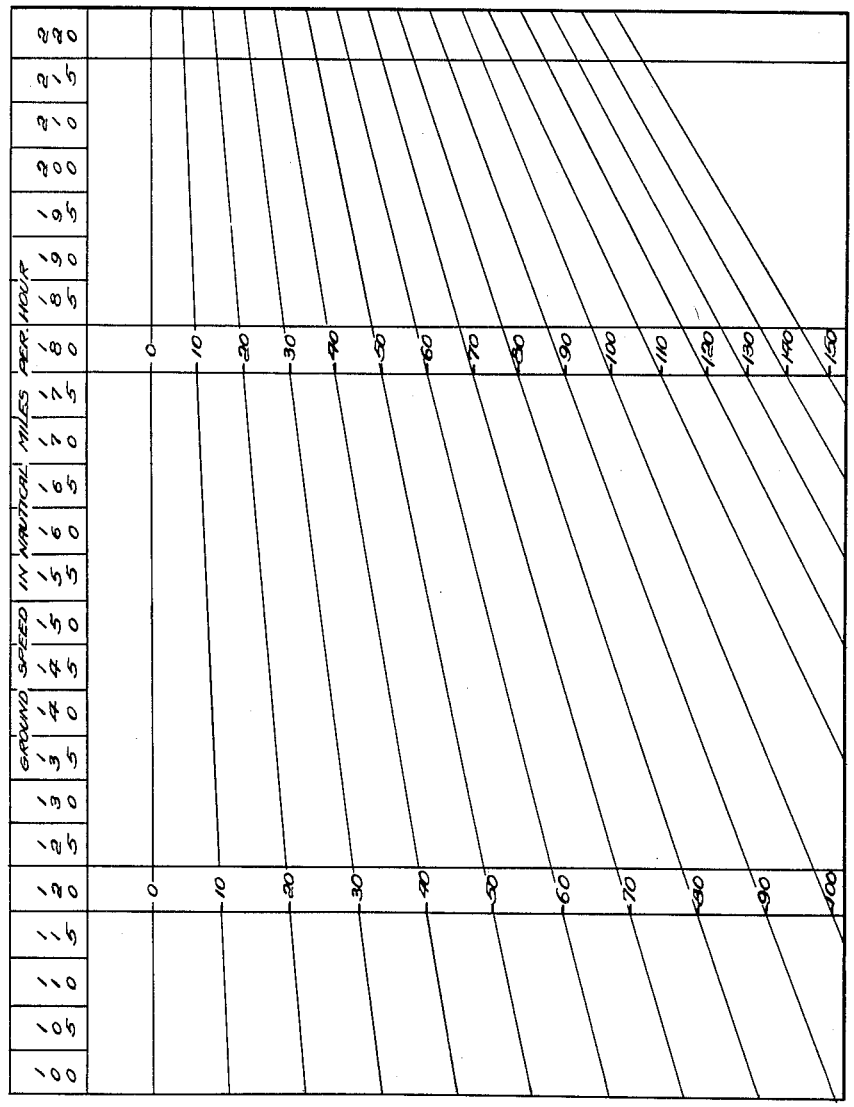
INVENTOR
ROBERT O. DUPONT,
BY Dodge and Sons
ATTORNEYS

United States Patent Office 3,037,693
Patented June 5, 1962

3,037,693
NAVIGATIONAL AID
Robert O. Du Pont, Stamford, Conn., assignor to American Greiner Electronic Inc., Stamford, Conn., a corporation of Connecticut
Filed June 5, 1961, Ser. No. 114,824
3 Claims. (Cl. 235—61)

This invention relates to a distance and time calculating device for determining the distance and time covered by a vehicle following a predetermined course of travel between two points which are a known distance apart.

In the piloting of small aircraft, the problem of instrument flying has proven to be quite difficult as a result of the inability of a single pilot to give sufficient attention both to the actual control of the aircraft and to the following of standard navigational procedures. Since many pilots of small aircraft prefer, for the sake of safety, to fly by instrument at relatively high altitudes to provide emergency landing altitude and to avoid bad weather, air congestion, and mountainous terrain, the importance of safe navigational procedures and reliable navigational equipment for single occupant aircraft cannot be overemphasized.

According to customary navigational procedure, a pilot flying a course between two known stations is required to advise the first station of his estimated time of arrival, with an accuracy of plus or minus three minutes, at the second station. Many types of pocket calculators have been proposed in the past for performing the calculations necessary to obtain this information. Often when a pilot is flying by instrument between two stations, he will be requested by a control tower to state his instantaneous position. Assuming that the aircraft is not provided with radio equipment for indicating position by triangulation methods and that the pilot is unable to determine his position from reference points on the ground, it is necessary for the pilot to perform rapid calculations by means of known calculators to determine the distance which he has traveled along the course and the distance and time which he is away from the next station. These calculations may be quite difficult to perform with accuracy when the pilot is occupied with handling the aircraft in rough weather, and errors in the calculations are quite common. Finally, when the pilot arrives at the check point, it is customary to calculate the average speed of the aircraft for the previous leg of the flight and the estimated time of arrival at the next check point, making the appropriate entries on his flight plan.

The object of the present invention is to provide an improved calculating device which continuously informs the pilot, during a leg of a flight, of the distance and time which he is away from the next station, together with his estimated time of arrival at this next station. According to an important feature of the invention, when the pilot reaches this next station he may operate the calculator in a simple manner to quickly and accurately determine the speed which the aircraft averaged during the prior leg of the flight, and to estimate the time required for the next leg of the flight and the estimated time of arrival at the next station. As a result of the invention, instrument flying may be safely and accurately accomplished by a single individual using merely the improved calculator, a watch, and conventional directional indicating means (such as a radio-beam magnetic compass device). The invention constitutes a reliable inexpensive substitute for the known radio-triangulation position determining devices and obviates the necessity of auxiliary pocket calculators and the like. Since the improved calculator presents continuous visual indications of the length of the leg, estimated time of flight of the leg, instantaneous distance and time to the next station, and estimated time of arrival, the keeping of a flight plan is greatly simplified and only the actual ground speed, elapsed time and actual time of arrival need be recorded.

The invention is characterized by the provision of a calculator frame having a window under which a speed-distance chart is adjustably mounted. A time indicator connected with the frame is driven by suitable motor means at a uniform rate of speed across the distance indicia of the chart and across a fixed time scale to provide a continuous visual indication of the instantaneous distance and time which the aircraft is away from its destination. An adjustable indicator is also provided which is operable, at the end of a leg of the flight, in conjunction with the adjustable chart and the time indicator to provide an indication of the actual ground speed averaged during the leg. Furthermore, adjustable tape means are provided for indicating the estimated time of arrival of the aircraft at a subsequent destination.

Other objects and advantages of the invention will become apparent from a study of the following specification when considered in conjunction with the accompanying drawings, in which:

FIG. 1 is a plan view of the airflight distance calculator;

FIG. 2 is a sectional view taken along line 2—2 of FIG. 1;

FIG. 3 is a sectional view taken along line 3—3 of FIG. 1; and

FIG. 4 illustrates the curves which appear on the speed-distance chart.

The calculator 1 is of such size, shape and weight that it is easily supported on the lap of a pilot without interfering with his operation of the aircraft. The calculator includes a rigid frame having a horizontal plate 2 supported by front, rear, and side walls 3a, 3b, 4a and 4b, respectively. The lower portions of the front and rear walls 3a and 3b are provided with grooves 5 adapted to receive the upper surfaces of the seated pilot's thighs. If desired, strap means may be provided for securing the frame to one of the pilot's legs.

The plate 2 contains a distance window 6 and a through slot 7, both of which are parallel with the side walls 4. A first cylinder 8, having a shaft 9 journalled in the front and rear walls, is mounted for rotation below the window 6. A second rotatable cylinder 11, having a shaft 12 journalled in the front and rear walls, is arranged parallel with the cylinder 8. A fixed guide rod 13 is secured at its ends between the front and rear walls intermediate and parallel with the cylinders 8 and 11. The speed-distance chart 14 of FIG. 4 is formed as an endless band and is mounted with light tension upon the cylinders 8 and 11 and the guide rod 13 as shown in FIG. 3. At one end shaft 9 extends through rear wall 3b and carries the knurled knob 15. Owing to the tension of chart 14, manual rotation of knob 15 effects rotation of cylinders 8 and 11 and corresponding linear movement of the chart below the window 6.

Mounted for sliding movement along slot 7 is the adjustable stop 16 which includes an indicator 17 adjacent the upper surface of plate 2, a guide flange 18 adjacent the lower surface of the plate, and a rectangular bar 19 connecting the flange with the indicator as shown in FIG. 2. Pivotally connected with the indicator 17 is the locking lever 21 having a cam surface 22 adjacent the upper surface of plate 2. Pivotal movement of lever 21 in the counterclockwise direction in FIG. 3 causes cam surface 22 to engage the upper surface of plate 2 and thus lock the stop indicator 17 in place.

Secured to the lower surface of plate 2 adjacent one end of the slot 7 is the timing motor 23, which motor in the preferred embodiment consists of a conventional clock mechanism having balance, fourth, and escapement wheels and main and hairspring assemblies. An example of a suitable timing motor is the common kitchen timer which is capable of establishing given periods of time ranging from one to sixty minutes. The motor 23 is provided with a rotary actuating shaft 24 which extends through the side wall 4b and carries the knurled knob 25. Secured upon shaft 24 is a first pulley 26 which lies in the vertical plane containing slot 7. A second pulley 27 lying in this same vertical plane adjacent the other end of slot 7 is provided with a shaft 28 journalled in fixed bearing means (not shown) in the frame. An endless cord 29 is mounted with slight tension on the pulleys 26 and 27 as shown in FIG. 2. An elapsed time element 31 is mounted for sliding movement along slot 7 and includes a guide flange 32 below plate 2, a time indicator 33 above the plate, and a rectangular bar 34 connecting the indicator with the flange. Flange 32 is secured to cord 29 so that the time indicator 31 is movable along slot 7 upon rotary movement of pulleys 26 and 27 and longitudinal travel of cord 29.

Although the indicator members 17 and 33 may be formed of any suitable rigid material, I prefer to form the members from a transparent, hard, synthetic plastic material, such as Lucite. As a result of the sliding cooperation between the sides of rectangular bars 19 and 34 and the sides of slot 7, the indicators 17 and 33 are always maintained normal to the axis of the slot.

As shown in FIG. 1, the upper surface of plate 2 is provided with a time-graduated scale 35 adjacent the right-hand edge of window 6. The graduations of this scale are uniformly spaced to establish a "minutes" time scale having a range extending from —5 to +60 minutes. The graduations may be formed in any suitable manner (for example, etching, printing, etc.) depending on the material from which the plate 2 is formed.

Secured to the lower surface of the plate 2 intermediate slot 7 and the right side wall 4b are a pair of spaced cassettes 36a and 36b. A flexible "estimated time of arrival" tape 37 is partially wound at one end in cassette 36a and extends upward through slot 38 in plate 2 and across the upper surface of the plate in a direction parallel with slot 7. At its other end, the tape extends downward through read-out slot 39 in plate 2 and is partially wound in cassette 36b. The tape is provided with "minutes" graduations of time having uniform spacings equal to the "minutes" graduations of scale 35, and the length of the tape is such that at least two sets of successive sixty-minute graduations are provided. As is shown in FIG. 1, the minutes graduations of scale 35 extend in the direction from the rear wall to the front wall, and the minutes graduations of the tape 37 extend in the direction from the front wall to the rear wall. The flexible tape 37 is formed of a suitable non-stretchable metallic or non-metallic material and is provided with a rigid tab 41. Manual movement of the tab 41 in a horizontal direction parallel with slot 7 causes the tape to be withdrawn at one end from one of the cassettes and to be wound at the other end in the other cassette.

Secured to the upper surface of plate 2 are a pair of spring-biased clamps 42 and 43 by means of which the "en route map and radio navigational aid" 44 and the "flight plan" 45, respectively, are mounted on the plate 2.

As shown in FIG. 4, the speed-distance chart 14 contains a plurality of distance curves each of which represents a given distance in nautical miles plotted against ground speed in nautical miles per hour (abscissa axis) and time in minutes (ordinate axis). The ordinate time scale is identical with time scale 35, and when the chart is mounted as an endless band upon the elements 8, 11 and 13 (the ends of the chart being connected with each other by conventional means, not shown), the ordinate time scale of the chart is directly opposite scale 35. Although, for the sake of clarity, only the distance curves for ten mile intervals have been illustrated in FIGS. 1 and 4, it is obvious that the chart may contain additional curves (for example, curves at two mile intervals), if desired. The speed range presented on the chart varies, of course, with the speed characteristics of the specific aircraft with which the calculator is to be used.

*Operation*

Assuming that a flight is to be made from station A to station D, the pilot mounts the appropriate "en route map and radio navigational aid" upon plate 2 by means of the clamp 42. Maps of this type are conventional in the aviation field and are provided by several commercial companies. A blank flight plan 45 is inserted under clamp 43.

Prior to take-off the pilot notes from map 44 that he will fly to station D along magnetic course 357° and that he will pass over check points B and C during his flight. He will also note the appropriate distances between stations A, B, C and D and will complete the first four columns of his flight plan 45. The expected take-off time (2:21 p.m.) will be entered in column 7. Assuming that the pilot expects to average 150 m.p.h. for the first leg of the flight (based on his familiarity with the flying characteristics of the aircraft for the given weather conditions), cylinder 8 is rotated by means of knob 15 until the speed "150 m.p.h." on chart 14 appears in window 6. Stop indicator 17 is moved along slot 7 until the upper edge 17a is opposite "22 miles" (the distance of the first leg of the flight) on chart 14, and locking lever 21 is depressed to lock indicator 17 in place. The estimated flight time to check point B (9 minutes) is now indicated on scale 35 opposite the upper edge 17a of indicator 17. By means of tab 41, the estimated time of arrival tape 37 is displaced linearly until the actual time "21" (2:21 p.m.) is opposite the edge 17a of indicator 17. The estimated time of arrival "30" (2:30 p.m.) may now be read from tape 37 at the read-out slot 39 and the pilot radios this estimated time of arrival at check point B to the control tower of station A.

Upon take-off, knob 25 is rotated in the counterclockwise direction (FIG. 2) to move indicator 33 in the direction of the front wall 3a until edge 33a engages edge 17a of stationary indicator 17. As is conventional with escapement-type clock timers, rotation of shaft 24 in one direction effects actuation of the motor 23, and the motor now drives indicator 33 at a uniform rate of travel toward the rear wall 3b. Throughout the flight to check point B, the lower edge 33a of indicator 33 presents a continuous indication of the distance to point B (from chart 14 as seen through window 6), the number of minutes which he is away from point B (from scale 35), and the actual time (from tape 37). The estimated time of arrival at check point B is indicated on tape 37 by the exposed upper or time of arrival read-out edge of slot 39. The distance of the flight leg, estimated time of flight of this leg, and actual time at which the aircraft left the last check point are presented opposite edge 17a.

Assuming now that the pilot reaches check point B at 2:29 p.m., the appropriate entry is made in column 7 of the flight plan. Since the distance between points A and B was covered faster than was anticipated, the lower edge 33a of indicator 33 has not yet reached a position opposite the zero indication on scale 35 and the actual average speed of the first leg of the flight was somewhat greater than the estimated speed of 150 m.p.h. Since at the time of arrival at check point B the edge 33a of indicator 33 was one minute short of the zero mark on scale 35, indicator 17 is unlocked and is moved toward the rear wall by a distance equal to one minute on scale 35. Knob 15 is now rotated until a "22 mile"

distance curve on chart 14 appears opposite edge 17a. The actual average miles per hour speed of the airplane for the flight between points A and B (165 m.p.h.) is presented at the upper end of window 6, and this figure is entered in column 5 on the station B line.

Assuming now that the pilot expects to average 180 m.p.h. for the next leg of the flight, cylinder 8 is rotated by knob 15 until the speed "180" appears in window 6. Lever 21 is released and indicator 17 is displaced along slot 7 until the edge 17a is opposite the distance "24" miles on chart 14. After indicator 17 is locked by the depression of lever 21, the estimated time of flight to station C (8 minutes) may be read off scale 35 opposite edge 17a. Tape 37 is moved by tab 41 until the actual time "29" (2:29 p.m.) appears under edge 17a, and the estimated time of arrival at check point C "37" (2:37 p.m.) is indicated at slot 39. This information is radioed to the control tower at station B, and knob 25 is rotated to move time indicator 33 into engagement with indicator 17, whereupon the indicator 33 is again driven at a uniform rate of travel by motor 23 toward the rear wall 3b as the pilot flies to check point C.

Assuming now that check point C is reached at 2:38 p.m., the appropriate entry is made in column 7 of the flight plan. The flight for this leg took longer than was expected (as a result of unexpected strong head winds, for example) and hence the edge 33a of indicator 33 has traveled one minute beyond the zero mark on scale 35. Lever 21 is released and indicator 17 is now moved toward front wall 3a a distance equal to one minute on scale 35. Knob 15 is rotated until a "24 mile" distance curve on chart 14 appears opposite edge 17a, at which time the actual speed (160 m.p.h.) appears at the upper end of window 6. The figure "160" is now entered in column 5.

Assuming now that the pilot expects to average 160 m.p.h. for the final leg of the flight, indicator 17 is unlocked and is positioned opposite distance value "25" on chart 14. Upon relocking of lever 21, the estimated flight time of 9½ minutes appears on scale 35 opposite the edge 17a and tape 37 is displaced until the actual time "38" (2:38 p.m.) appears opposite edge 17a. The estimated time of arrival "47½" appears on tape 37 at slot 39, and this information is relayed to the control tower of station C.

Assuming now that the pilot arrives at station D at 2:48 p.m., the appropriate entry is made in column 7. Since the edge 33a has traveled one half a minute beyond the zero graduation on scale 35, indicator 17 is released and is moved a distance equal to one half a minute on scale 35 toward the front wall 3a. Knob 15 is rotated until the "25" mile distance curve on chart 14 appears under edge 17a, and the actual average flight speed (150 m.p.h.) is noted from the upper end of window 6 and is entered in column 5.

It is apparent that by the use of the present invention, the pilot is continuously advised of his distance to the next check point, the number of minutes which he is away from the next check point, actual time, and estimated time of arrival at the next check point. Suppose that sometime during the last leg of the flight the pilot had been requested to state his instantaneous position. At a glance he could advise the control tower that he was flying vector V–99, magnetic course 357°, his distance from station D (from the point on chart 14 opposite edge 33a), his time from station D (from scale 35 opposite edge 33a), and his estimated time of arrival at station D (tape 37 at slot 39). The altitude of the aircraft, of course, would be indicated by a standard indicator.

Although the means for driving indicator 33 at a constant speed has been illustrated and described as being a clock-type motor and pulley-cord arrangement, the use of other types of constant speed motors, such as a battery-powered electric motor, and other types of motion transmitting means is also contemplated.

While the best form and embodiment of the invention has been illustrated and described in the patent application, it will be apparent to those skilled in the art that other changes and modifications may be made in the apparatus described without deviating from the invention set forth in the following claims.

What is claimed is:

1. An estimated time of arrival navigational aid comprising
   a frame having a plate containing a window and provided with a stationary flight time scale adjacent and parallel with an edge of said window, said flight time scael having an origin and equally spaced indicia, said plate also having an estimated time of arrival readout point opposite and spaced from said time scale origin;
   an estimated time of arrival scale slidably connected with said plate adjacent said window for movement in a direction parallel with said flight time scale relative to said read-out point, said estimated time of arrival scale having an origin and indicia spaced in increments equal to, and of an opposite sense than, the spacing of the indicia of the flight time scale;
   a speed-distance cylinder rotatably connected with said frame beneath said window and parallel with the longitudinal axis thereof, said cylinder bearing rows of distance indicia arranged parallel with the axis of said cylinder, each of said rows consisting of equally spaced distance indicia the spacing of which is a function of a given flight speed and the spacing of the indicia of the time scale;
   indicating means movably connected with said frame for presenting an indication movable solely along a linear fixed path on said plate intermediate and parallel with said flight time and said estimated time of arrival scales;
   and motor means connected with said frame for driving said indicating means at a uniform rate of speed solely in a first direction to displace said indication linearly in one direction along the fixed path, said indicator means being freely movable in the opposite direction to displace said indication linearly in the opposite direction along the fixed path.

2. Apparatus as defined in claim 1 wherein said estimated time of arrival scale is a flexible tape.

3. Apparatus as defined in claim 2 wherein said tape is arranged on the upper surface of said plate, said plate containing a pair of spaced parallel slots arranged normal to said flight time scale, the ends of said tape extending downwardly through the slots.

References Cited in the file of this patent

UNITED STATES PATENTS

| | | |
|---|---|---|
| 2,424,763 | Marschak | July 29, 1947 |
| 2,487,590 | Rehill | Nov. 8, 1949 |
| 2,508,898 | Stronstorff | May 23, 1950 |

FOREIGN PATENTS

| | | |
|---|---|---|
| 28,662 | Great Britain | of 1913 |